(No Model.)

J. W. CAMERON.
YEAST CAKE.

No. 427,553. Patented May 13, 1890.

UNITED STATES PATENT OFFICE.

JAMES W. CAMERON, OF NEW YORK, N. Y.

YEAST-CAKE.

SPECIFICATION forming part of Letters Patent No. 427,553, dated May 13, 1890.

Application filed October 3, 1889. Serial No. 325,934. (No specimens.)

*To all whom it may concern:*

Be it known that I, JAMES W. CAMERON, of the city, county, and State of New York, have invented a new and useful Improvement in the Manufacture of Dry Yeast-Cakes; and I do hereby declare that the following is a full and exact description thereof, reference being had to the accompanying drawings, and to the letters of reference marked thereon, making a part of this specification.

This invention relates to an improvement in dry yeast and the method of pressing and protecting the same against climatic influences.

It has for its object to furnish yeast for family use in small packages and in such form as that the air and all moisture shall be wholly excluded therefrom, so that it will retain its life and efficiency for an indefinite period and in all climates, and be unaffected by its surroundings.

It consists in enveloping dry yeast prepared according to any of the well-known formulas, first, in a coating of sugar, and, second, in an outer water-proof coating of paraffine, shellac, or other innocuous mineral, or vegetable wax or gum, impervious to water, the package of yeast thus protected by a saccharine water-proofed envelope constituting in itself a new article of manufacture.

Figure 1:
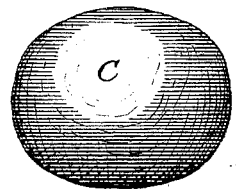
Figure 2:
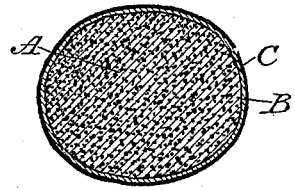

In the accompanying drawings, Figure 1 represents in elevation my improved sugar-coated water-proof yeast-cake, and Fig. 2 is a diametric section thereof.

In the manufacture of this improved article I take any good dry yeast, such as that made by the following well-known formula, viz: Take of hops, say, three and one-half ounces, and steep in fifteen quarts of hot water. Strain off the infusion, and while it is hot add thereto three and three-fourths pounds of rye flour and three and three-fourths ounces of ginger. When the mixture has become lukewarm, add thereto one-half pint of fresh beer-yeast, and allow the compound to ferment. Then add seven and three-fourths pounds of corn or barley meal and knead the mass thoroughly into stiff dough. This plastic mass is then formed into small cakes, preferably of a spherical or oblate form and of a diameter of about an inch and a half, more or less, so that each shall contain sufficient yeast for use in an ordinary family baking, and the cakes are allowed to dry in a warm room until free from all moisture and entirely hard. The cakes may be thus molded into form by hand, but preferably by machinery designed for the purpose. The hard dry yeast-cake thus produced, and which is represented at A in Fig. 2 of the drawings, is next coated with sugar (seen at B, Fig. 2) applied thereto in a hot creamy condition in manner as is well known to the confectioner's art—viz., by causing a number of the cakes to roll over one another in a confection-pan properly heated, and into which the sugar is poured from time to time until all the cakes are evenly coated with a saccharine envelope. This coating, when cooled, is exceedingly hard, and is air-tight, although readily soluble and easily affected by exposure to dampness or moisture. The cakes thus sugar-coated, so as to be hard and air-tight, are finally coated with a thin layer C of paraffine or wax or other equivalent water-proof substance, the application thereof being preferably accomplished by placing the cakes in a revolving case or tumbler heated to a proper temperature, and into which the paraffine or its equivalent is introduced. The paraffine thus made to thoroughly coat and cover the hard envelope B of sugar protects it fully against moisture or dampness in any form, and still further insures an absolute exclusion of air from the inclosed yeast without in any manner affecting its value and efficiency.

I contemplate the use of various innocuous gums—such as shellac—as an equivalent substitute for paraffine or other mineral or vegetable wax in coating the yeast-cakes, the gum being applied by first dissolving it in alcohol or other volatile solvent, and then coating the cakes with the liquid.

Where the outer coating C consists of a hard gum—such as shellac—it forms a case or shell more or less brittle, which may be readily cracked and peeled off the cake before it is used; but if the outer envelope be of paraffine it need not be removed, as its presence in the yeast will not be discernible, the paraffine itself in its pure state being tasteless, as well as wholesome, and of advantage in the bread.

In the use of my improved sugar-coated water-proof yeast the cake is to be broken and dissolved in warm water, and when fully dissolved it is ready for use as any ordinary yeast, and in the same manner under the same conditions.

I claim as my invention—

1. The process of preserving dry yeast, which consists in forming it into cakes or balls, and coating each, first, with sugar, and, second, with an innocuous water-proof substance, substantially in the manner and for the purpose herein set forth.

2. The herein-described improved sugar-coated waterproofed yeast-cake, as a new article of manufacture.

In testimony whereof I have signed my name to this specification in the presence of two subscribing witnesses.

JAMES W. CAMERON.

Witnesses:
A. N. JESBERA,
E. M. WATSON.